(12) United States Patent
Park (10) Patent No.: US 6,578,861 B2
(45) Date of Patent: Jun. 17, 2003

(54) RECIPROCATING TYPE DRIVING MECHANISM

(76) Inventor: Jun-Shin Park, 248-105, Guui 1-Dong, Kwangjin-Gu, Seoul 143-826 (KR)

(*) Notice: Subject to any disclaimer, the term of this patent is extended or adjusted under 35 U.S.C. 154(b) by 0 days.

(21) Appl. No.: 10/043,667

(22) Filed: Jan. 10, 2002

(65) Prior Publication Data

US 2002/0105161 A1 Aug. 8, 2002

(30) Foreign Application Priority Data

Jan. 20, 2001 (KR) .................................... 2001-0003457

(51) Int. Cl.[7] .................................................. B62M 1/02
(52) U.S. Cl. ........................ 280/252; 280/253; 280/254; 280/257
(58) Field of Search ............................... 280/252, 253, 280/254, 257, 214, 256, 244, 245

(56) References Cited

U.S. PATENT DOCUMENTS

| | | | | |
|---|---|---|---|---|
| 4,019,230 A | * | 4/1977 | Pollard | 280/214 |
| 4,564,206 A | * | 1/1986 | Lenhardt | 280/252 |
| 5,527,246 A | * | 6/1996 | Rodgers, Jr. | 482/57 |
| 6,173,986 B1 | * | 1/2001 | Sicher | 280/647 |
| 6,209,900 B1 | * | 4/2001 | Yoshizawa | 280/252 |
| 6,302,226 B1 | | 10/2001 | Kanno et al. | 180/6.5 |
| 6,331,029 B1 | | 12/2001 | Schenk | 296/122 |

* cited by examiner

*Primary Examiner*—Lesley D. Morris
*Assistant Examiner*—Tony Winner
(74) *Attorney, Agent, or Firm*—Lee & Hong (57) ABSTRACT

A reciprocating type driving mechanism for use for a bicycle, baby carriage and wheel chair, which can provide convenience in driving to the user and which comprises: a front and rear wheels W1 and W2; a gear box B; a driving and driven gears 20 and 30 and a side gear 31 formed integrally with the driven gear 30; driving members 40 each comprising three links 41, 42 and 43; a pinion 50 adapted for alternate operation of the driving members 40; a head gear 60 in meshed connection with the side gear 31; an intermediate gear 70 positioned below the head gear 60; a relaying gear 81 in meshed connection with the intermediate gear 70; an output gear 82 provided at the bottom part of the driving axle 80 for transmitting the torque; and a hub gear 90 in meshed connection with the output gear 82 (FIG. 1).

5 Claims, 9 Drawing Sheets

Fig.10

RECIPROCATING TYPE DRIVING MECHANISM

FIELD OF THE INVENTION

The present invention relates to a driving mechanism for driving a bicycle, baby carriage, wheel-chair or the like and more particularly to a reciprocating type driving mechanism for driving a bicycle, baby carriage, wheel-chair or the like, which driving mechanism can be driven in a convenient or comfortable manner by a user.

BACKGROUND OF THE INVENTION

Generally, conventional bicycles are constructed to be driven by rotating the pedals fully around 360° and therefore are not ergonomically suitable for leg exercise, so that operating the pedal is inconvenient. Further, there is another problem of the decrease in running power due to the absence of driving force, when the user's foot is pressed in the upper or rear direction while rotating the pedal.

In addition, the conventional bicycles are complicated in the structure of the body due to the crank mechanism installed in the middle part of the body and the chain mechanism extending from the middle part to the rear wheel and are somewhat too long and furthermore the diameters of wheels are limited. As the result, the improvement in travelling speed is difficult because of the limitation in the design, even when the improvement in travelling speed is sought for urban type bicycles through increasing the diameter of bicycle wheels, while decreasing the wheel diameter, as required, is not possible as well. Travelling difficulty in mountain areas or on uphill roads causes another problem.

On the other hand, structural problem is associated with conventional baby carriages, because patrons or patronesses are not possible to ride in the carriages due to the construction in which the patrons or patronesses are supposed to push the carriages from the rear. Conventional wheel chairs are inconvenient in that users have to take their hands off the wheels before touching and rotating the wheels again after preceding drives in a repeated manner.

BRIEF DESCRIPTION OF THE INVENTION

Whereas FIGS. 1 to 8 show a bicycle in which the reciprocating type driving mechanism according to the present invention is installed.

DETAILED DESCRIPTION OF THE INVENTION

A preferred embodiment of the invention is described below in detail by referring to the accompanying drawings.

The driving mechanism according to the invention, as shown in FIGS. 1 to 10, is basically characterized in that it comprises comprising: a front and rear wheels W1 and W2 provided in the front and rear parts of a car body 10; a gear box B provided on the head pipe 11 of the car body 10; a driving and driven gears 20 and 30 in meshed engagement and a side gear 31 formed integrally with the driven gear 30, those gears being built in the gear box B; driving members 40 each comprising three links 41, 42 and 43 for rotating the driving gear 20 only in the advancing direction through unidirectional clutches C1, the driving members being provided on the both sides of the car body 10; a pinion 50 in meshed connection with the racks 42a formed on the second links 42 and adapted for alternate operation of the driving members 40; a head gear 60 in meshed connection with the side gear 31 and provided on a lower part of the head pipe 11 through a bearing 61; an intermediate gear 70 provided through a unidirectional clutch C2, the intermediate gear being positioned below the head gear 60; a relaying gear 81 in meshed connection with the intermediate gear 70 and provided at the top part of a driving axle 80, the driving axle passing through a hook 13 of a steering axle 12 and being fitted in the head pipe 11; an output gear 82 provided at the bottom part of the driving axle 80 for transmitting the torque; and a hub gear 90 in meshed connection with the output gear 82 and attached to the hub H of the front wheel W1.

The vehicle body 10, which constitutes the skeleton of a bicycle, baby carriage or wheel chair, each to be driven by the driving mechanism according to the invention, has a head pipe 11 fixed at a front position of the body 10, wherein a steering axle 12 is fitted rotatably in the head pipe 11. To a hook 13 provided under the steering axle 12, there is connected to a hub H of the front wheel W1 rotatably.

A gear box B attached to the head pipe 11 houses a driving gear 20, driven gear 30 and side gear 31. The driving gear 20 is provided rotatably in meshed engagement with the driven gear 30 within the gear box B, wherein the side gear 31 is formed integrally the driven gear 30 on a side of the latter.

Driving members 40 each consisting of three links 41, 42 and 43, which are provided on both sides of the vehicle body 10, are caused to move up and down alternately by means of a pinion 50 to drive the driving gear 20 to thereby cause the front wheel W1 to advance only in the forward direction, which will be described further in the following.

The first links 41 are mounted, at their respective front positions, with unidirectional clutches C1, which are connected to an axle 21 for the driving gear 20, the rear end of each of the first links 41 being formed with a long hole 41a.

The second links 42 are movable up and down inside the upper and lower guiding members 44, wherein the top end of each second link 42 is connected rotatably to each first link 41 by means of a pin 45 passing through the long hole 41a. The insides of the second links 42 are formed integrally with racks 42a to be in meshed engagement with the pinion 50. The upper and lower guiding members 44 for guiding the vertical movement of the second links 42 are fixed to the vehicle body 10.

The third links 43, which are connected rotatably to the car body 10 by means of axle pins 46 are formed, at the front ends, with long holes 43a, through which pins 47 are inserted for connection to the lower ends of the second links 42 in a rotatable manner.

Figure 7:
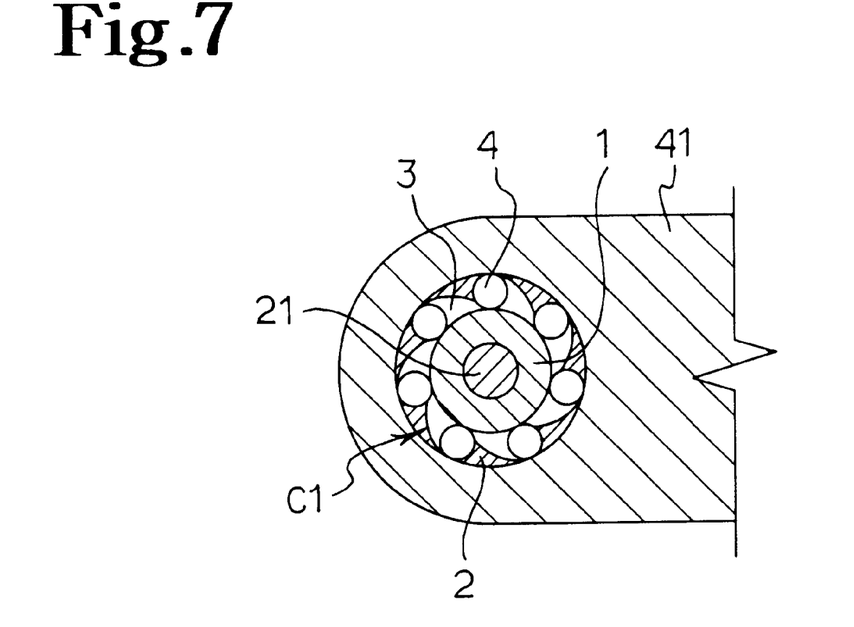
FIG. 7 shows the cross section illustrating the structure of a unidirectional clutch.
Figure 8:
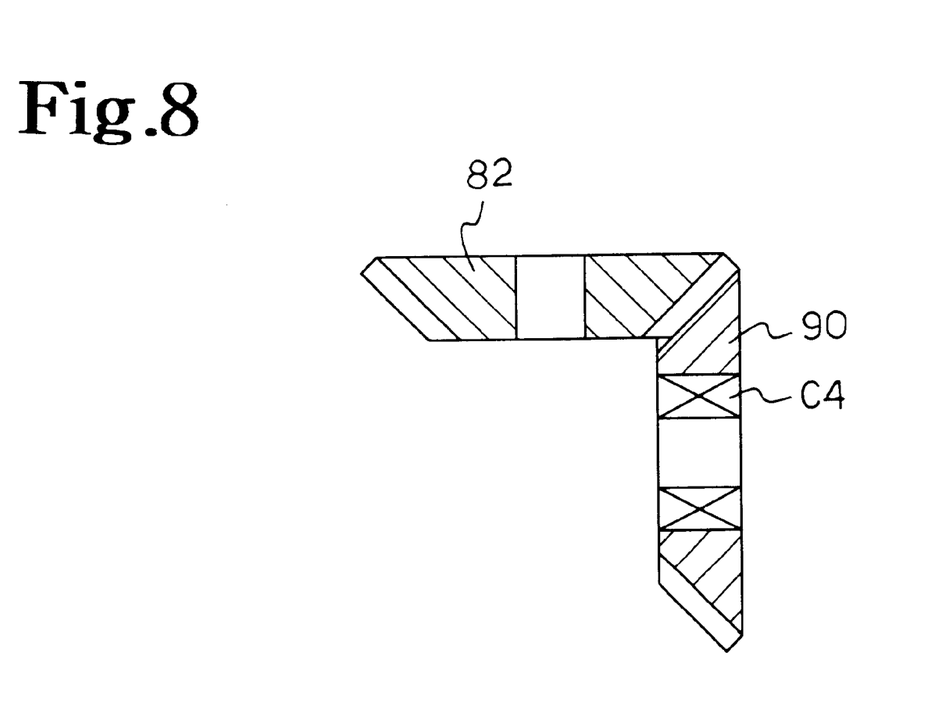
FIG. 8 shows the cross section for an output gear and hub gear.

The above-described unidirectional clutches C1 comprise each an inner wheel 1 pressed on the axle 21 for the driving gear 20 and an outer wheel 2 pressed in the first link 41 at its front location, as seen in FIG. 7, wherein needles 4 each fitted in a number of clutch grooves 3 formed in the outer wheel 2 are in contact with the outer surface of the inner wheel 1.

Figure 4:
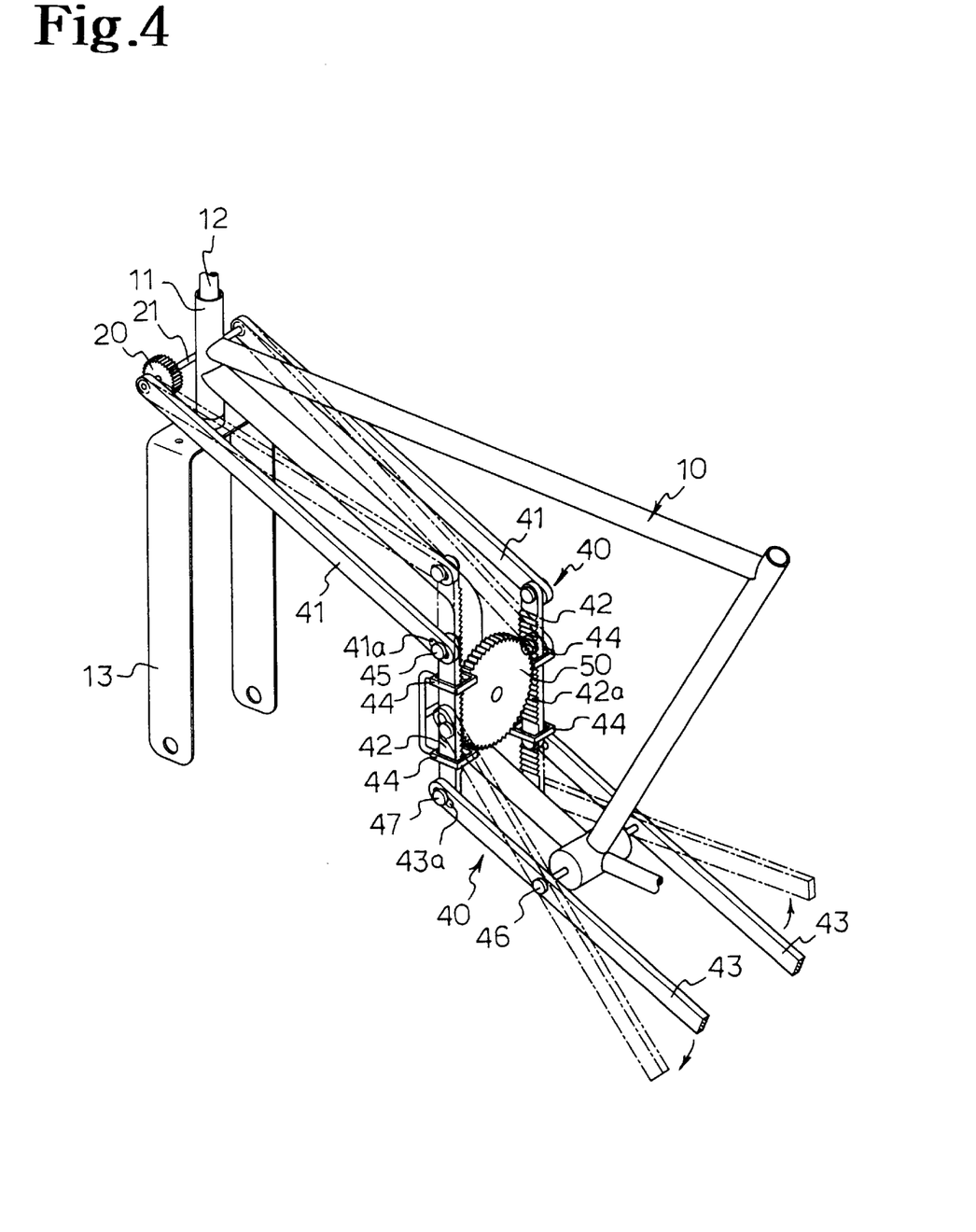
FIG. 4 shows the perspective view of driving members illustrating the operation thereof.
Figure 5:
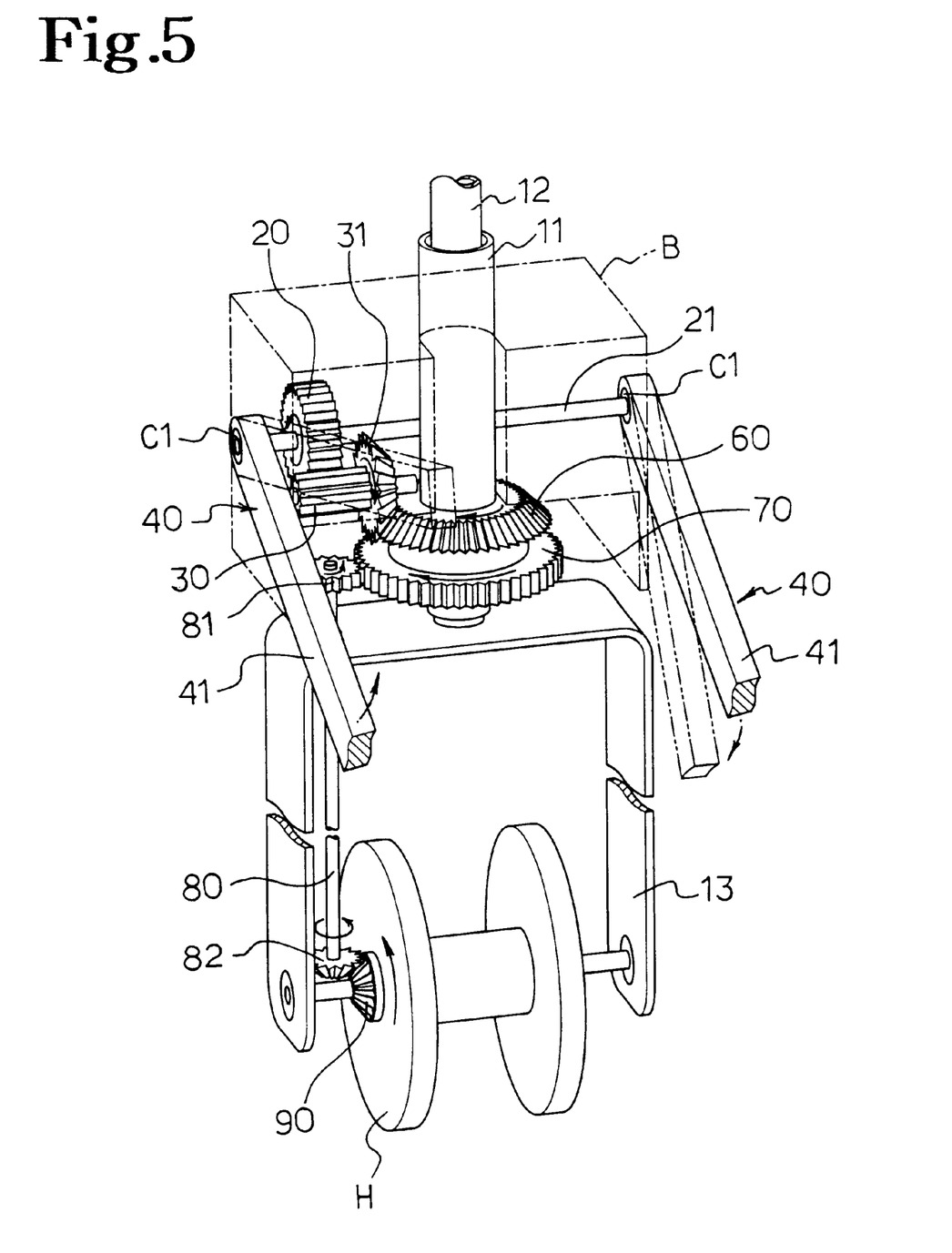
FIG. 5 shows the perspective view of inside structure of a gear box.

Such unidirectional clutches C1 are generally known. When a first link 41 is rotated anticlockwise or in the advancing direction for the front wheel, the outer wheel 2 is rotated anticlockwise to press the needles 4 inserted in the clutch grooves 2 of the outer wheel 2 into the narrower spaces of the clutch grooves 3 to a restraint, so that the torque of the outer wheel 2 may be transmitted to the inner wheel 1 to rotate the driving gear 20 anticlockwise, as seen in FIGS. 4 and 5. On the contrary, when a first link 41 is rotated clockwise or in the retreating direction for the front wheel, the needles 4 are moved to the expanded parts of the clutch grooves 3 to be set free, with the result that the torque transmission from the outer wheel 20 is interrupted to prevent the inner wheel 1 from turning.

Figure 1:
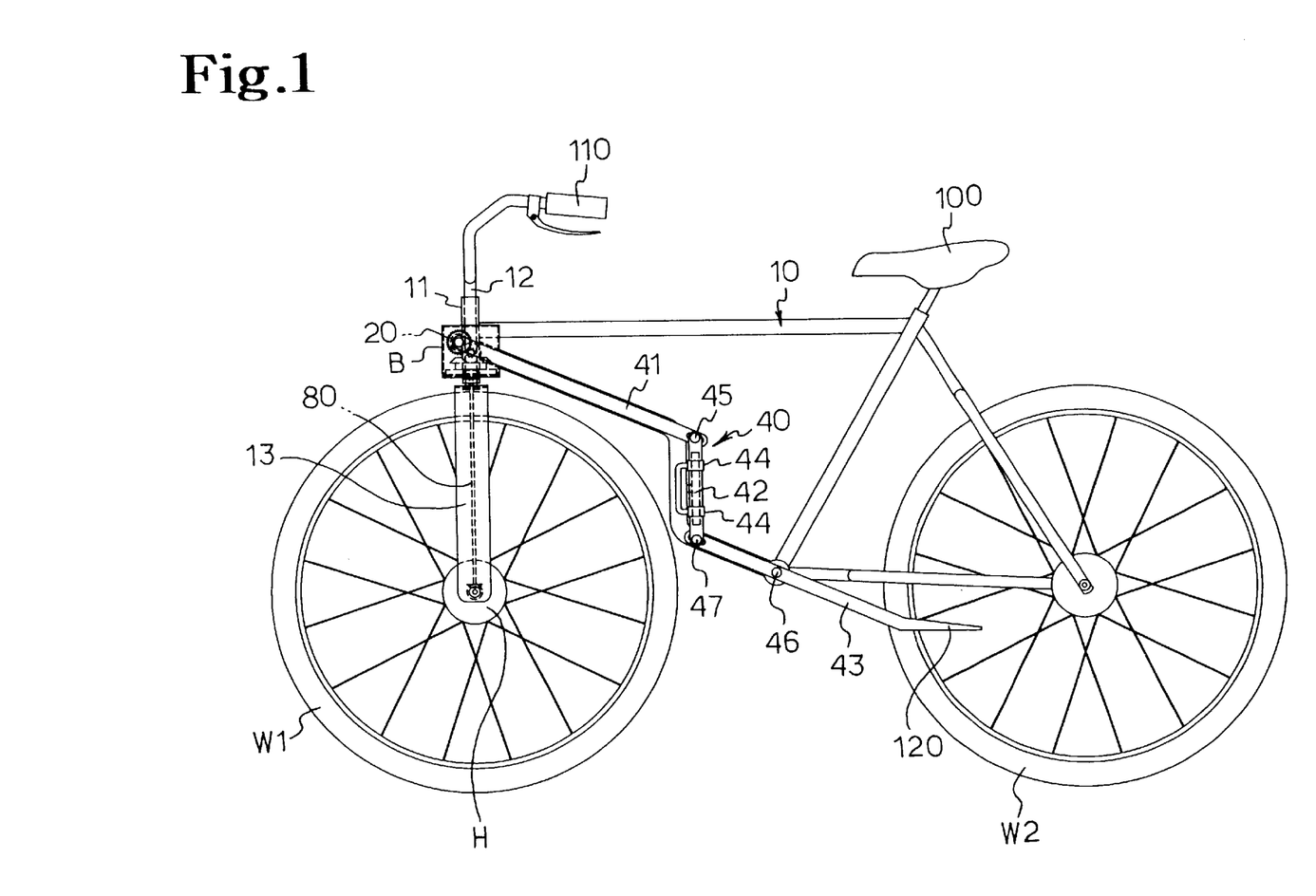
FIG. 1 shows the front view of the bicycle in which the reciprocating type driving mechanism according to the present invention is installed.
Figure 2:
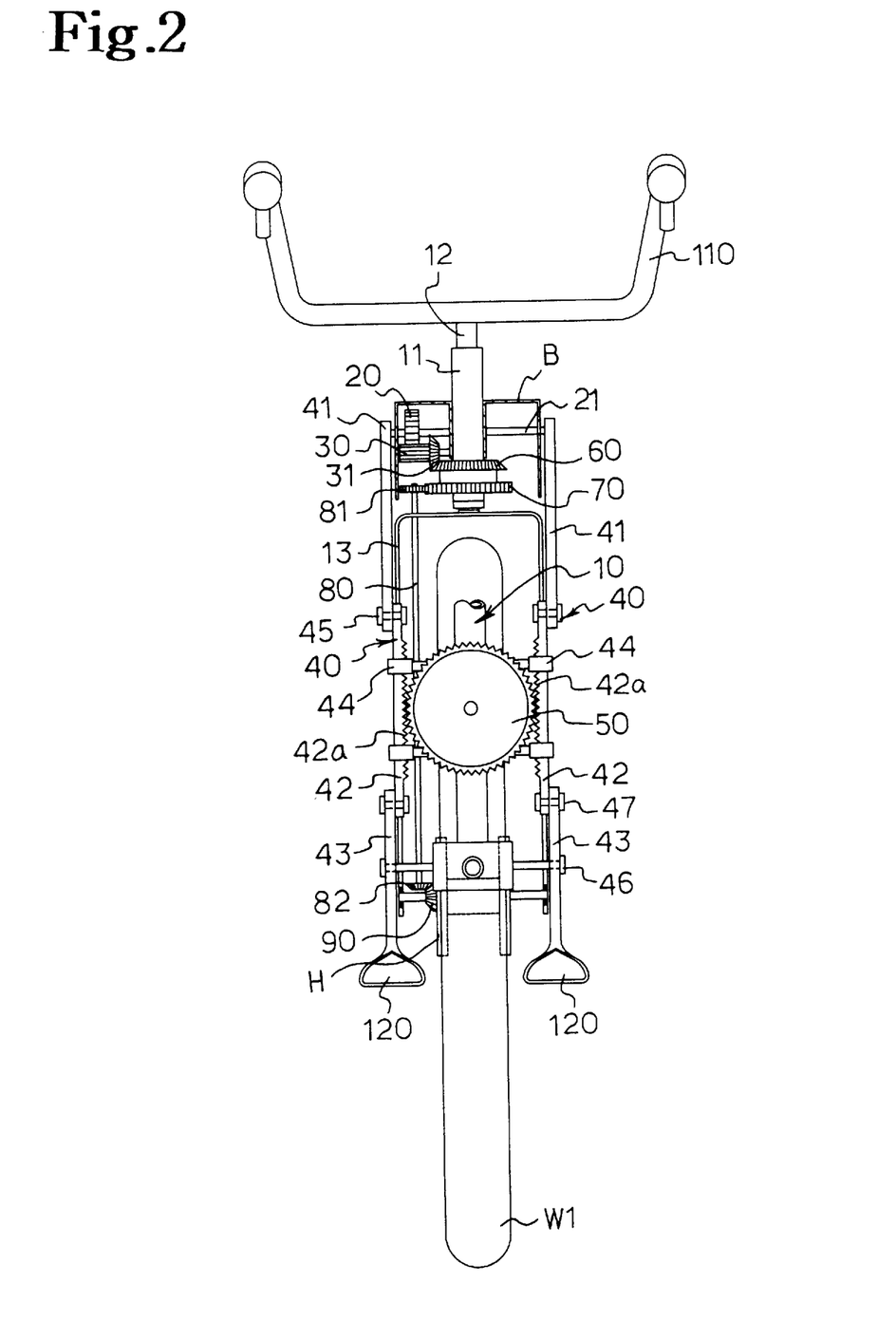
FIG. 2 shows the side view of the bicycle shown in FIG. 1.
Figure 3:
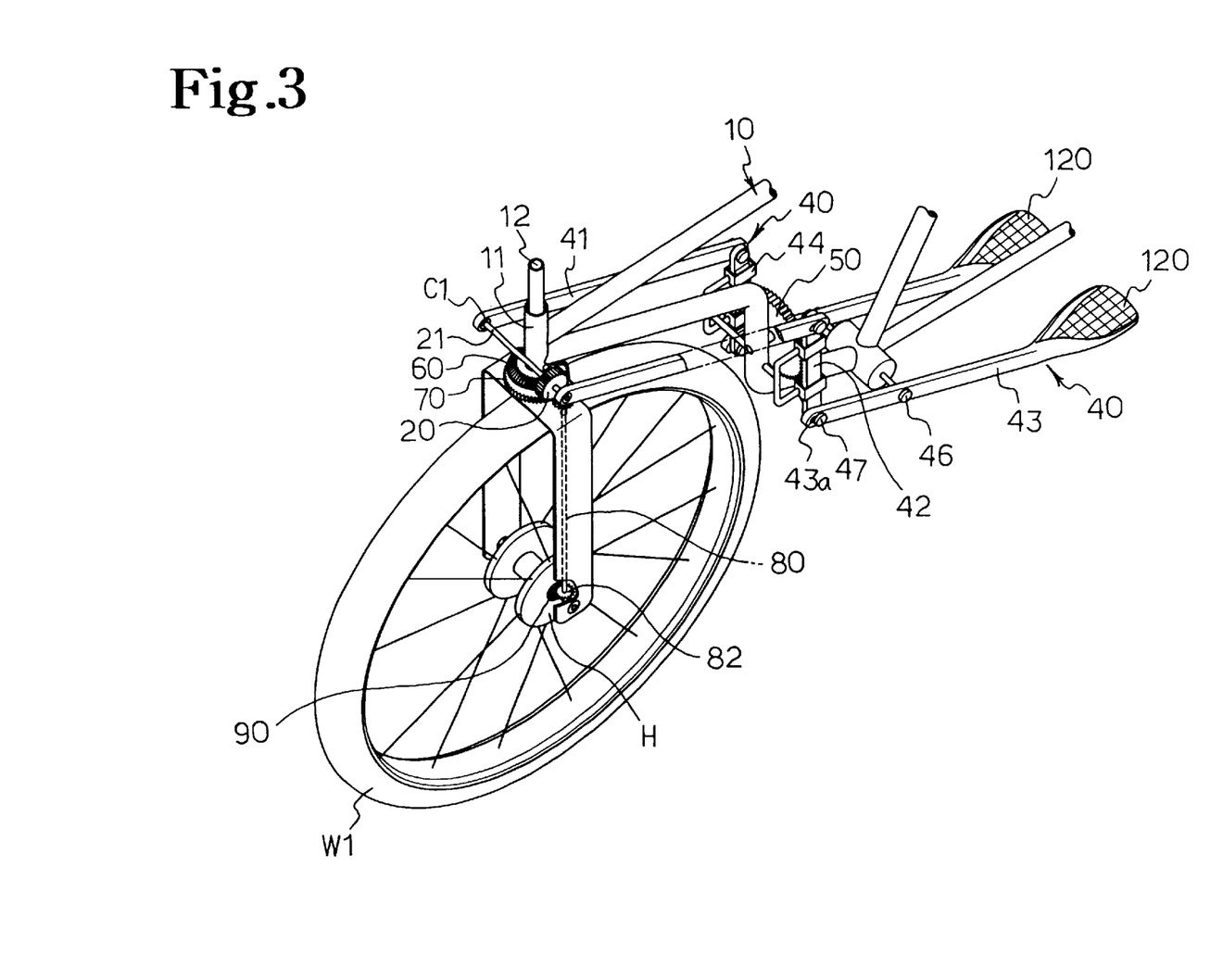
FIG. 3 shows the perspective view of the important part of the invention.

The pinion 50 is installed rotatably on the car body 10, as shown in FIGS. 3 and 4, and is meshed in the racks 42a of the second links 42 on both sides, so that this pinion 50 can cause a upward movement of the second link 42 on one side and a downward movement of the second link 42 on the other side during one cycle followed by the reverse movements of the second links 42 during the subsequent cycle, these both cycles being repeated for continuous advancing travel.

Accordingly, when the rear end of one of the third links 43 is pressed down, the front end of the third link 43, which is adapted to turn around the axle pin 46, moves one of the second links 42 upward to thereby turn one of the first links 41 in such a direction as to advance the front wheel W1 or in anticlockwise direction in the example, whereby the driving gear 20 is accordingly turned anticlockwise through the active unidirectional clutch C1.

However, at this time, the driving member 40 on the other side is operated reversely due to the pinion 50 to cause the other of the first links 41 to turn clockwise. However, the transmission of torque to the driving gear 20 is blocked due to the unidirectional clutch C1 mounted on that first link 41, which unidirectional clutch C1 however acts to transmit the torque to the driving gear 20 to advance the front wheel W1 at the next cycle when the rear part of the link 43 of the other driving member 40 is pressed down. Therefore, the driving gear 20 can be turned continuously only in the anticlockwise direction so as to move the front wheel W1 forward by pressing down the rear part of one third link 43 and then pressing down the rear part of the other third link 43 having been raised in the mean time and repeating the alternate pressing action on both sides, wherein the alternate operation of both driving members 40 is made possible by the mediating pinion 50.

Thus, the rotating force of the driving gear 20 brought into anticlockwise rotation through the driving members 40 is transferred to the driven gear 30, which is now turned clockwise and causes the side gear 31 integrally formed to turn clockwise also.

Figure 6A:
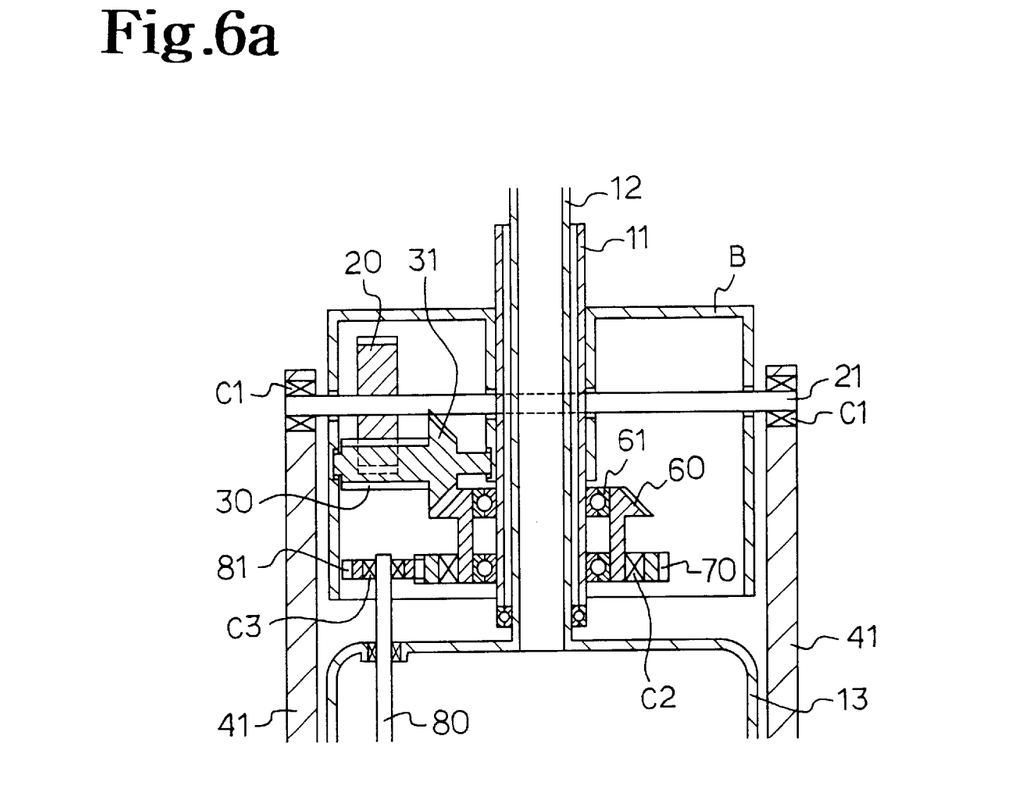
FIGS. 6a and 6b show the longitudinal and plan cross sections of a gear box.
Figure 6B:
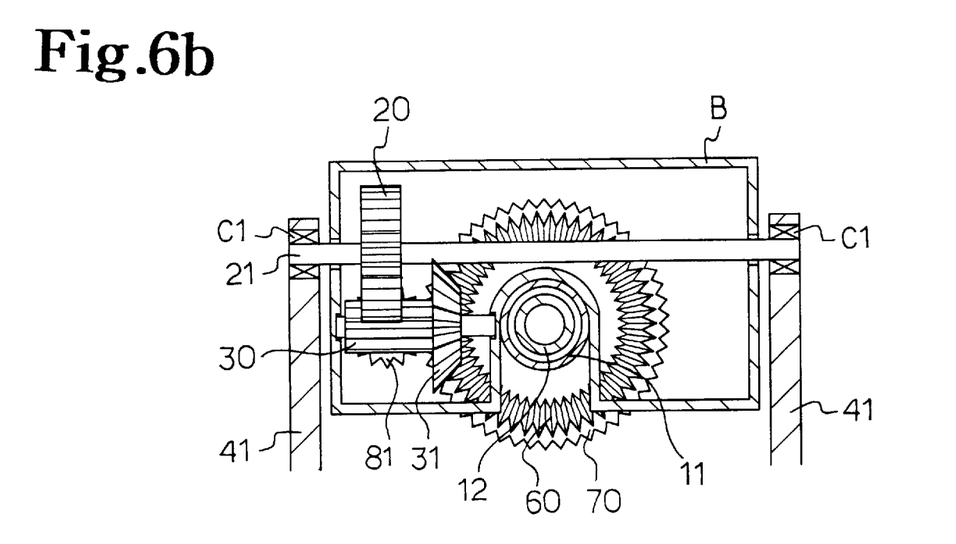

A head gear 60 rotatably mounted on the outside of the head pipe 11 at its lower part through a bearing 61 is in meshed connection with the side gear 31, as seen in FIG. 6a to rotate in the arrow direction as indicated in FIG. 5 under the torque transferred from the side gear 31 rotating clockwise.

An intermediate gear 70 mounted below the head gear 60 through an unidirectional clutch C2, as shown in FIG. 6a, is rotated in the arrow direction, as indicated in FIG. 5, under the torque as transferred from the head gear 60. However, if the intermediate gear 70 is rotated in the direction reverse to the arrow direction during switching of direction between the left and right for the front wheel W1, the torque is not transferred to the head gear 60 by means of the clutch C2.

A driving axle 80 which is provided rotatably through a location at the side top of a hook 13 as seen in FIG. 6a is provided, on its top end, with a relaying gear 81, which is rotatable in the direction as indicated in FIG. 5 under the torque transmitted from the intermediate gear 70. Simultaneously, an output gear 82 mounted on the bottom of the driving axle 80 is brought into rotation in the direction indicated as an arrow in FIG. 5.

Similarly as described above, the inner bore of the relaying gear 81 is also provided with a unidirectional clutch C3, which acts to prevent the torque from being transferred to the intermediate gear 70 if the relaying gear 81 turns in the counter-arrow direction as the consequence of the change in steering direction for the front wheel W1, although the relaying gear 81 is normally rotatable in the arrow direction as indicated in FIG. 5 under the torque transmitted from the intermediate gear 70.

A hub gear 90, which is mounted on the hub H of the front wheel W1 in meshed connection with the output gear 82, is turned anticlockwise or in the indicated direction in FIG. 5 by the torque received from the output gear 82 simultaneously to cause the front wheel W1 to advance.

Here again, as the inner bore of the hub gear 90 is also provided with a unidirectional clutch C4, the hub gear 90 is rotated in the direction indicated as arrow mark under the torque from the output gear 82 to bring the front wheel W1 into advancing travel, but the torque is not transferred to the output gear 82 due to the clutch C4 when the front wheel W1 is rotated in backward direction.

Of the arrays of meshed gears as described above, the driving gear 20, driven gear 30, intermediate gear 70 and relaying gear 81 are each composed of a spur gear, while the side gear 31, head gear 60, output gear 82 and hub gear 90 are each composed of a bevel gear. It is to be noted that the unidirectional clutches C2, C3 and C4 are of the same construction as the unidirectional clutch C1 as depicted in FIG. 7.

In the reciprocating type driving mechanism according to the invention constructed as above, during the pressing-down period of one and the other driving members 40 when the driving members 40 are operated alternately, the driving gear 20 is rotated anticlockwise through the unidirectional clutches C1, the torque of the driving gear 20 is transmitted to the driven gear 30 to rotate it together with the side gear 31 clockwise, the torque of the side gear 31 is transmitted to the head gear 60 to rotate the intermediate gear 70 in the direction marked as the arrow in the drawing, the output gear 82 is turned in the direction marked as arrow, as the torque of the intermediate gear 70 is transmitted to the relaying gear 81, and finally the torque of the output gear 82 is transmitted to the hub gear 90 to ultimately rotate the front wheel W1 continuously in the anticlockwise direction so that it can be proceeded forward.

Thus, the power transmission in the driving mechanism according to the invention takes place in the order: the third link 43 as the starter, the second link 42, the first link 41, unidirectional clutch C1, driving gear 20, driven gear 30, side gear 31, head gear 60, unidirectional clutch C2, intermediate gear 70, relaying gear 81, unidirectional clutch C3, driving axle 80, output gear 82, hub gear 90, unidirectional clutch C4 and finally the front wheel W1.

In the case the relaying gear 81 is rotated in the reverse direction in consequence of directional change between the left and right for the front wheel W1 during travel, the transmission of the torque of the reverse direction to the head gear 60 and intermediate gear 70 is blocked through the unidirectional clutches C2 and C3, as described above. Therefore, no interference with the power transmission during travel is generated to allow smooth change in travelling direction and to prevent interference with gears or damage, wear-out or the like.

Even when the hub gear 90 is rotated in the reverse direction due to the backward movement of the front wheel W1, that torque corresponding to the reverse direction is prevented from being transmitted to the output gear 82 due to the unidirectional clutch C4 built in the hub gear 90, as explained above.

An embodiment of the invention represented in FIGS. 1 to 8, in which the driving mechanism according to the present invention, constructed and operated as described above, is applied, is equipped with a bicycle saddle 100 at the upper top part of the chassis 10, a handle bar 110 on the top of the steering axle 12 and pedals 120 capable of being pressed down alternately and provided at the rear ends of the driving members 40 on both sides, wherein the pedals 120 are formed such that a user can engage and disengage his feet comfortably.

Conventional bicycles were designed to be driven by rotating the pedals through 360° and therefore were not suitable ergonomically for physical exercise including legs, so that operating the pedal is inconvenient. Further there was posed another problem of the decrease in travelling power due to the absence of driving force, when the user's foot is pressed in the upper or rear direction while rotating the pedal. However, when the inventive driving mechanism is mounted on a bicycle, power is generated by operating the driving members on both sides through simple alternate pressing of the pedals within a limited rotating angle, with the result that first the motion of driving is convenient and furthermore the user's body weight can be additionally applied at the time of pressing-down the pedals with his feet, whereby intensified driving force can be used to attain a higher speed or an enabled or easy ascending of a steep uphill road, when needed.

The crank mechanism installed in the middle part of the car body and the chain mechanism extending from the middle part to the rear wheel, needed for conventional bicycles, can be dispensed with so as to simplify the structure of car body as well as to decrease its length. The improvement in travelling speed is possible for urban type bicycles through increasing the diameter of bicycle wheels, while decreasing the wheel diameter, as required, is also possible. Particularly, driving through the front wheel contributes to producing additional advantage of easy and comfortable operation in mountain regions or upward slopes.

Figure 9:
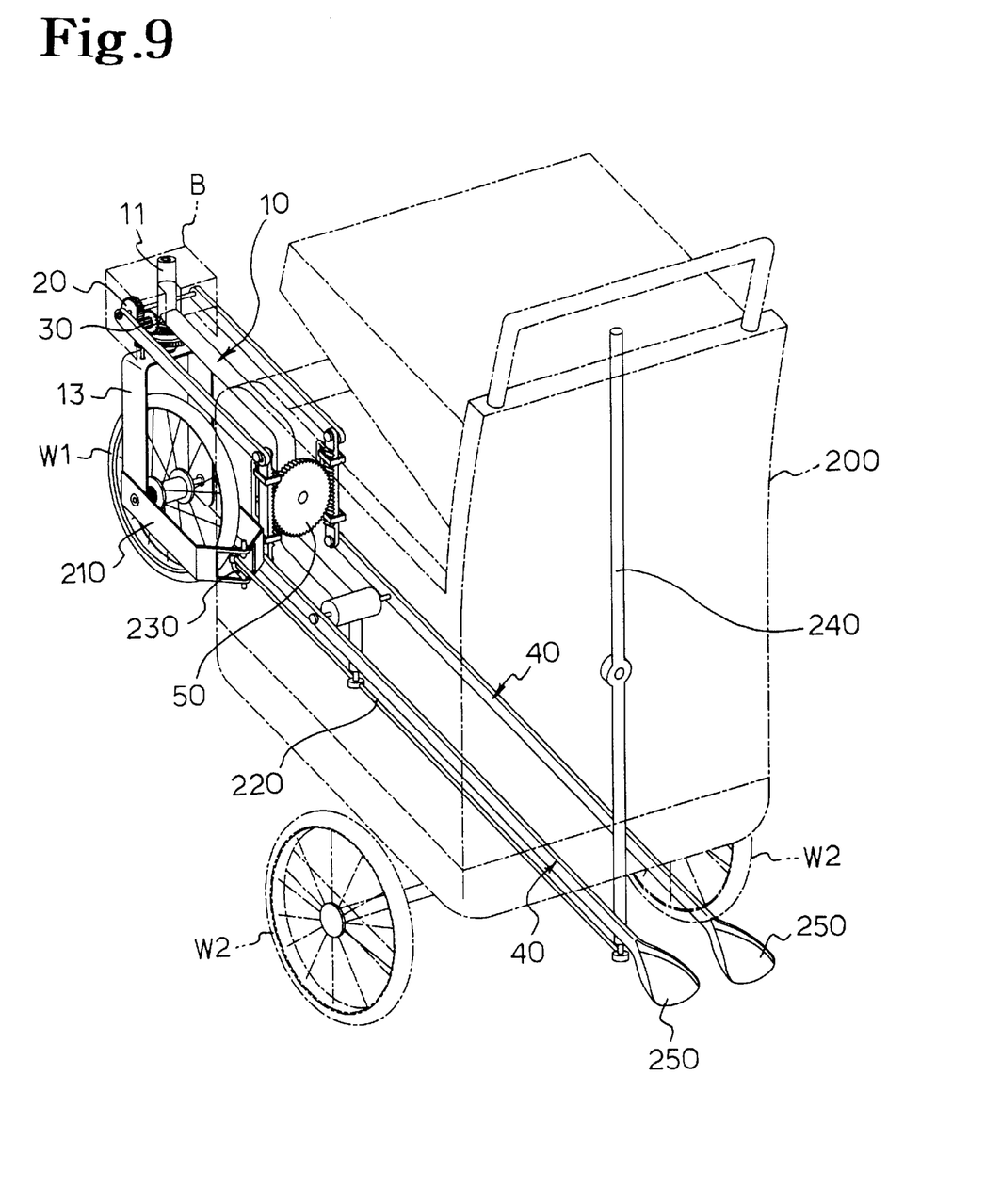
FIG. 9 shows the perspective view illustrating the driving mechanism according to the invention installed in a baby carriage and FIG. 10 shows the perspective view illustrating the driving mechanism according to the invention installed in a wheel chair.

FIG. 9 shows another embodiment in which the inventive driving mechanism is applied to a baby carriage, wherein a seat 200 is provided in the upper rear location of the car body 10, steering forks 210 are connected to the hook 13 on the both sides, an operating lever 220 is connected to the rear end of the steering forks 210 through a knuckle 230, the operating lever 220 being connected to the car body 10 swingably, in the rear of the seat 200 a steering key 240 is provided vertically in swingable manner and is connected, at its bottom end, to the rear end of the operating lever 220 and both driving members 40 are provided, at their rear ends, with pedals 250 adapted to be pressed, the pedals protruding backward beyond the seat 200.

While the conventional baby carriage has the structural problem that the operator can not ride in the carriage due to the design based on the assumption of pushing from the rear side, the baby carriage, in which the driving mechanism according to the invention is incorporated, allows the operator to reciprocate the pedals in turns while riding in the carriage. Further, the operator can easily regulate the advancing direction of the front wheel W1 while riding on the carriage, by operating the steering key 240 to actuate the operating lever 220, knuckle 230 and steering fork 210.

Figure 10:
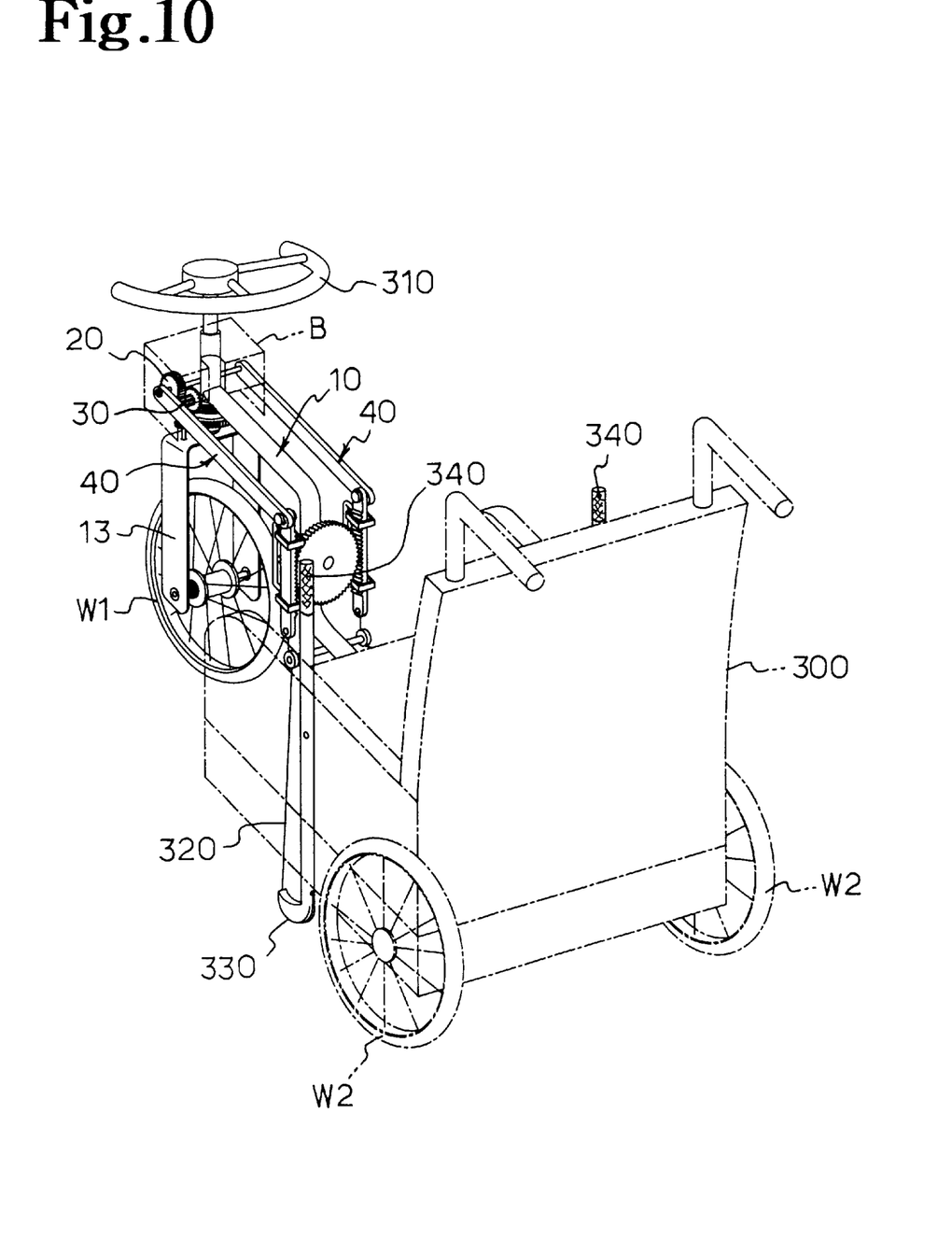

FIG. 10 shows still other embodiment in which the inventive driving mechanism constructed and operated as described above is applied to a wheel chair, wherein a seat 300 is provided in the rear part of a car body 10, a steering wheel 310 is provided on the top of a steering axle 12, the third links 43 of driving members 40 are connected to the second links 42 through wires 320, the third links being connected rotatably to the both sides of the seat 300 and the lower ends of the third links 43 are formed with curved surfaces 330 while the upper ends of the third links 43 are respectively provided with driving handles 340 for alternate operation.

Conventional wheel chairs were inconvenient in that users have to take their hands off the wheels before touching and rotating the wheels again after preceding drives in a repeated manner. When the inventive driving mechanisms are used for wheel chairs, operating both handles 340 alternately causes the driving members 40 to operate through the wires 320 to thereby drive the front wheels W1, so that the users can operate the wheel chairs more conveniently, easily adjusting the advancing direction of front wheels through the operation of steering wheels 310.

It is to be understood that, while the invention was described with respect to specific embodiments, the invention is never restricted to those embodiments and a variety of modifications and alterations depending on the cases would be possible to a man skilled in the art by referring to the description or drawings presented here and within the spirit of the invention and thus those modifications or alterations are intended to fall within the scope of the invention, which scope should be limited only by the attached claim.

What is claimed is:

1. A reciprocating driving mechanism comprising: a front and rear wheels (W1, W2) provided in the front and rear parts of a car body (10); a gear box (B) provided on a head pipe (11) of the car body (10); a driving and driven gears (20, 30) in meshed engagement and a side gear (31) formed integrally with the driven gear (30), those gears being built in the gear box (B); driving members (40) each comprising three links (41, 42, 43) for rotating the driving gear (20) only in the advancing direction through a first set of unidirectional clutches (C1), the driving members being provided on the both sides of the car body (10); a pinion (50) in meshed connection with the racks (42a) formed on the second links (42) and adapted for alternate operation of the driving members (40); a head gear (60) in meshed connection with the side gear (31) and provided on a lower part of the head pipe (11) through a bearing (61); an intermediate gear (70)

provided through a second unidirectional clutch (C2), the intermediate gear being positioned below the head gear (60); a relaying gear (81) in meshed connection with the intermediate gear (70) and provided at the top part of a driving axle (80), the driving axle passing through a hook (13) of a steering axle (12) and being fitted in the head pipe (11); an output gear (82) provided at the bottom part of the driving axle (80) for transmitting the torque; and a hub gear (90) in meshed connection with the output gear (82) and attached to the hub (H) of the front wheel (W1).

2. The driving mechanism according to claim 1, wherein the relaying gear (81) and hub gear (90) are provided with a built-in third set of unidirectional clutches (C3, C4) respectively.

3. The driving mechanism according to claim 1, wherein a saddle (100) is provided on the upper rear part of the car body (10), a handle bar (110) is provided on the top of the steering axle (12), and pedals (120) for alternate vertical reciprocation are respectively provided on the rear part of the both driving members (40).

4. The driving mechanism according to claim 1, wherein a seat (200) is provided in the upper rear location of the car body (10), steering forks (210) are connected to the hook (13) on the both sides, an operating lever (220) is connected to the rear end of the steering forks (210) through a knuckle (230), the operating lever (220) being connected to the car body (10) swingably, in the rear of the seat (200) a steering key (240) is provided vertically in swingable manner and is connected, at its bottom end, to the rear end of the operating lever (220) and both driving members (40) are provided, at their rear ends, with pedals (250) adapted to be pressed, the pedals protruding backward beyond the seat (200).

5. The driving mechanism according to claim 1, wherein a seat (300) is provided in the rear part of a car body (10), a steering wheel (310) is provided on the top of a steering axle (12), the third links (43) of driving members (40) are connected to the second links (42) through wires (320), the third links being connected rotatably to the both sides of the seat (300) and the lower ends of the third links (43) are formed with curved surfaces (330) while the upper ends of the third links (43) are respectively provided with driving handles (340) for alternate operation.

* * * * *